Figure 10:
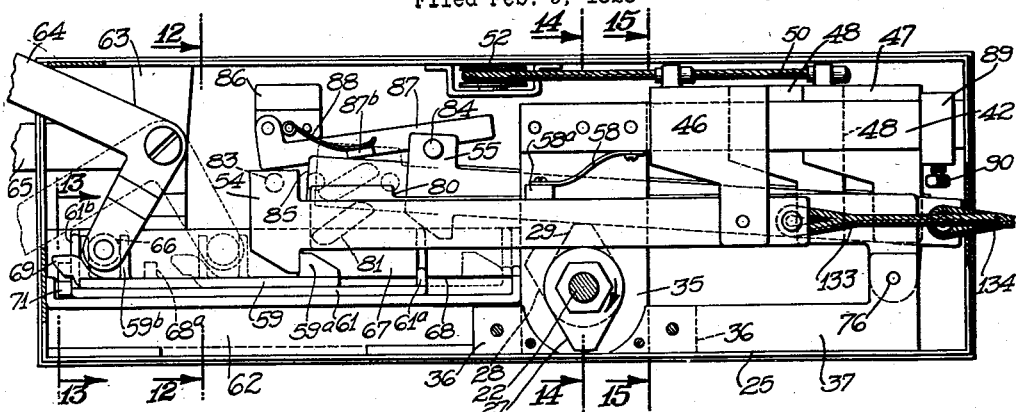

July 5, 1927.
O. E. MARK
1,634,504
AUTOMATIC POWER TRANSMISSION CONTROL MECHANISM
Filed Feb. 9, 1925   5 Sheets-Sheet 1
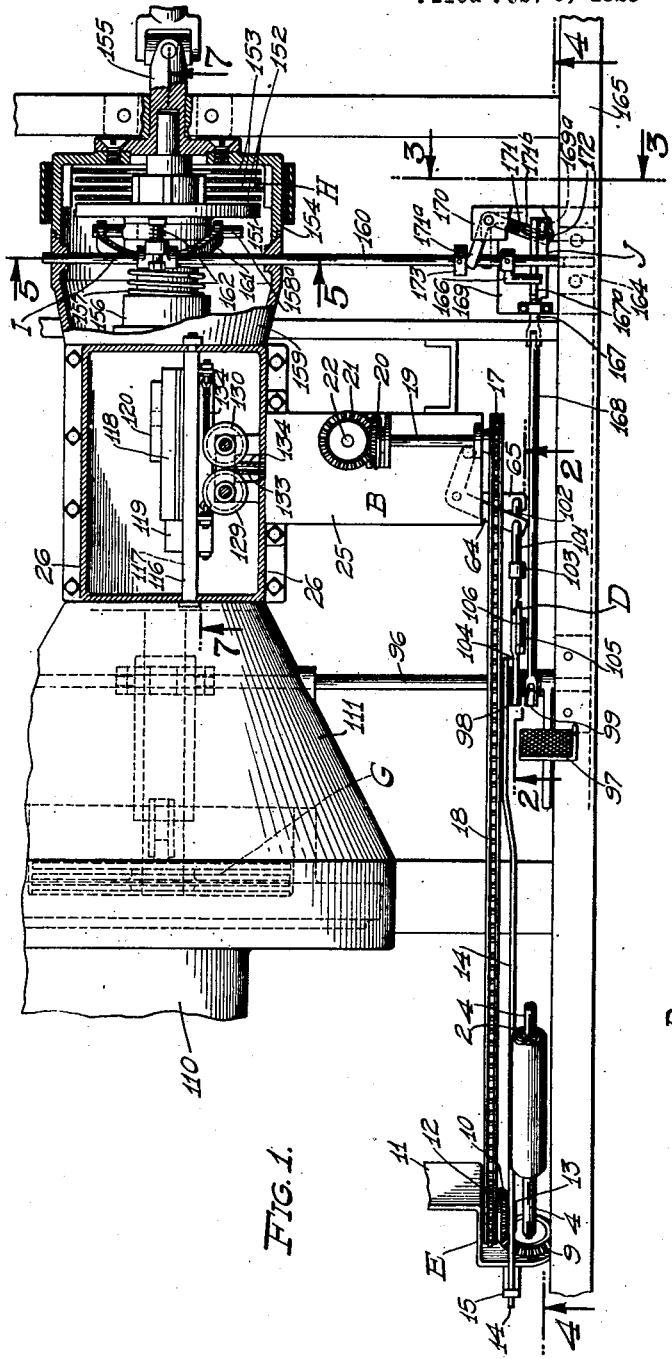
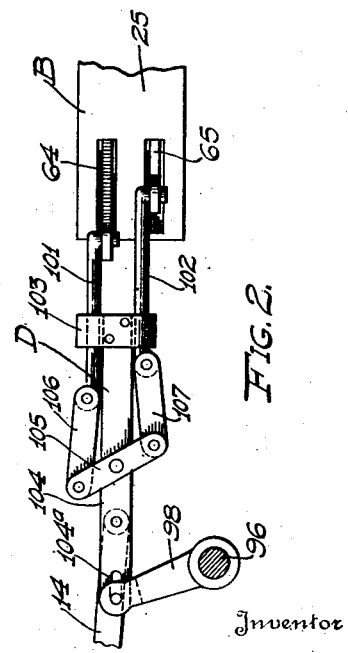
Inventor
OVID E. MARK.
By A. B. Bowman
Attorney

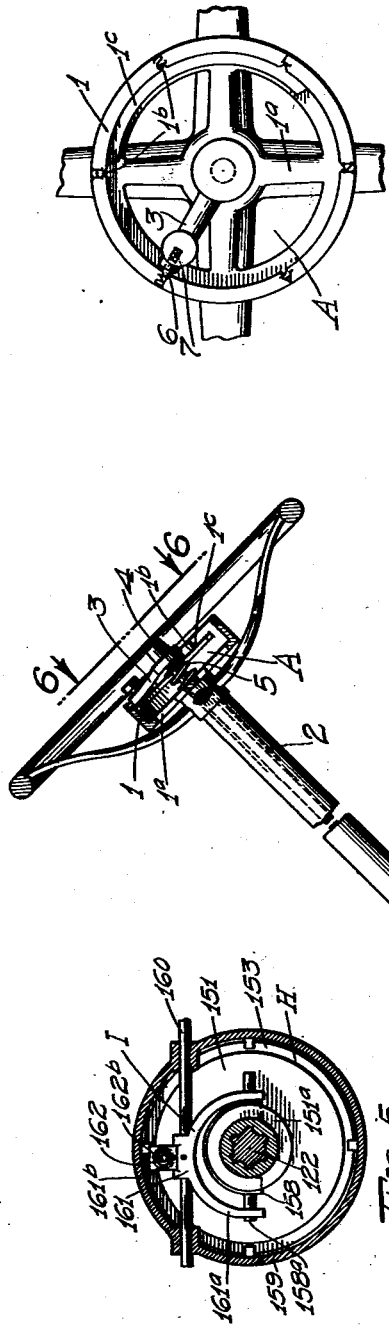

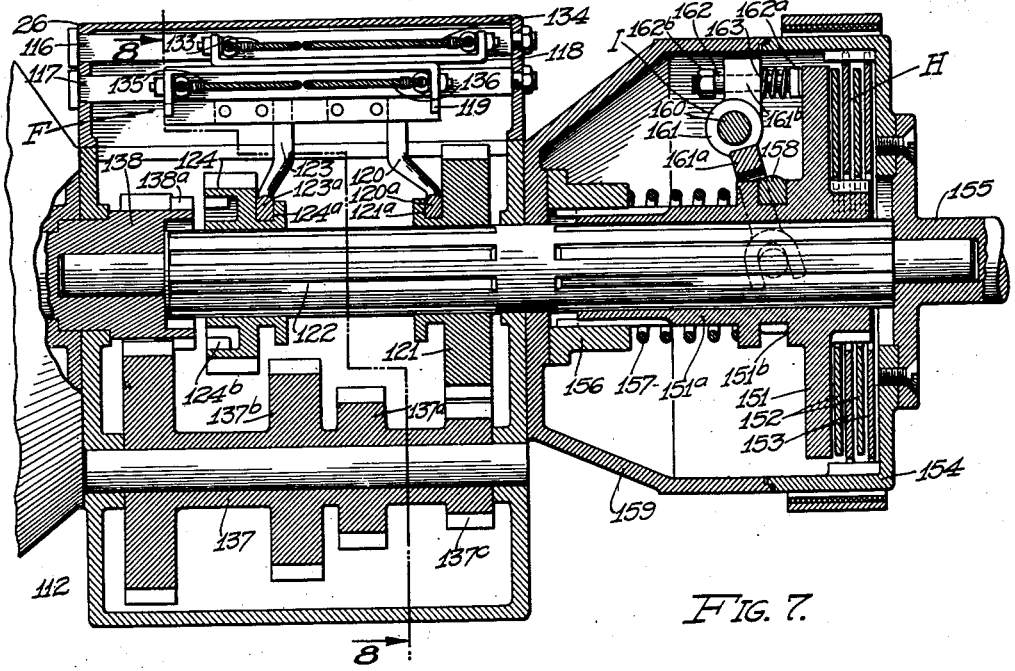

July 5, 1927.  1,634,504
O. E. MARK
AUTOMATIC POWER TRANSMISSION CONTROL MECHANISM
Filed Feb. 9, 1925  5 Sheets-Sheet 4

Inventor
OVID E. MARK.
By A. B. Bowman
Attorney

July 5, 1927.

O. E. MARK 1,634,504

AUTOMATIC POWER TRANSMISSION CONTROL MECHANISM

Filed Feb. 9, 1925    5 Sheets-Sheet 5

Inventor

OVID E. MARK.

By A. B. Bowman

Attorney

Patented July 5, 1927.

1,634,504

UNITED STATES PATENT OFFICE.

OVID E. MARK, OF SAN DIEGO, CALIFORNIA.

AUTOMATIC POWER-TRANSMISSION CONTROL MECHANISM.

Application filed February 9, 1925. Serial No. 7,856.

My invention relates to an automatic power transmission control mechanism, particularly adapted for controlling the shifting of gears in power transmission mechanisms of automotive vehicles.

The objects of my invention are: First, to provide a power transmission control mechanism of the class mentioned whereby the conventional gear shift lever of automobiles is eliminated; second, to provide a mechanism of this class whereby the gear selection of the transmission mechanism is made at the end of the steering wheel of the vehicle or other place near and handy to the operator of the vehicle; third, to provide a mechanism of this class whereby a gear selection may be made long before the gears of the transmission mechanism are actually shifted or the speed and direction of the vehicle actually changed; fourth, to provide a mechanism of this class whereby, after the gear selection is made on the manual selecting means, the gears are shifted in the transmission mechanism by the foot after the clutch is thrown out or the transmission mechanism disconnected from the power plant; fifth, to provide a mechanism of this class in which the gears of the transmission mechanism are shifted by the clutch pedal; sixth, to provide a power transmission control mechanism whereby the vehicle may be alternately shifted from reverse to forward and forward to reverse by merely operating the clutch pedal; seventh, to provide a control mechanism of this class which may be so set that the gearing of the transmission mechanism is automatically shifted consecutively from low to intermediate and high speeds by merely operating the clutch or other foot pedal when desiring to change speeds; eighth, to provide a novel gear selecting means for a mechanism of this class; ninth, to provide a transmission gear selecting means whereby only one gear may be shifted at one time and whereby said one gear may be shifted only after the others are shifted to a neutral position; tenth, to provide means in connection with a gear power transmission mechanism whereby the shiftable gears thereof are slightly rotated during their longitudinal shifting movement, thereby reducing to a minimum the clashing of gears when shifting the same, when desiring to change speeds or direction of the vehicle; eleventh, to provide a transmission mechanism for automotive vehicles which is automatically disconnected from both the power plant and driven or propelling mechanism when shifting the gears thereof, thus substantially separating the same from the rest of the vehicle and reducing to a minimum the clashing of gears when shifting the same; twelfth, to provide a unitary means for controlling a main and secondary clutch means adapted to connect and disconnect a power transmission mechanism respectively to and from a power plant and propelling mechanism; thirteenth, to provide a novel means for setting the transmission control mechanism whereby the gears are automatically shifted for consecutively changing the speed of the vehicle from low to high; fourteenth, to provide as a whole a novelly constructed automatic power transmission control mechanism, and fifteenth, to provide a mechanism of this class which is simple and economical of construction proportionate to its functions, durable, efficient, reliable, compact, easy to operate, and which will not readily deteriorate or get out of order.

Figure 11:
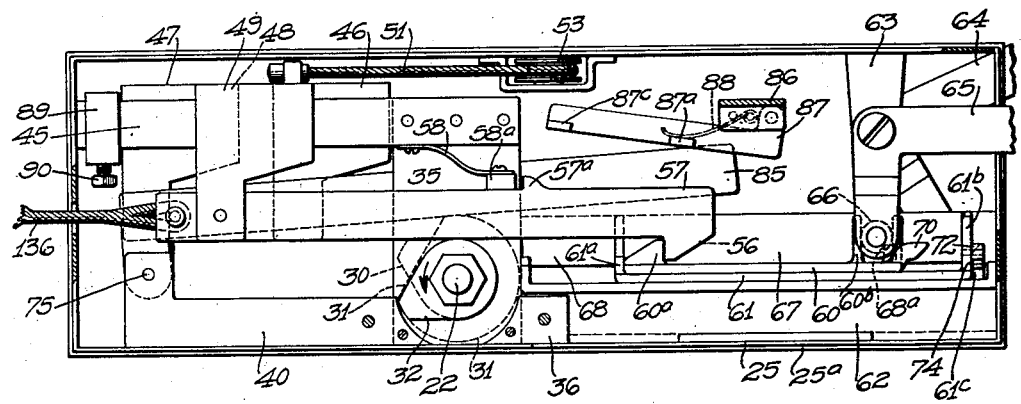
Figure 16:
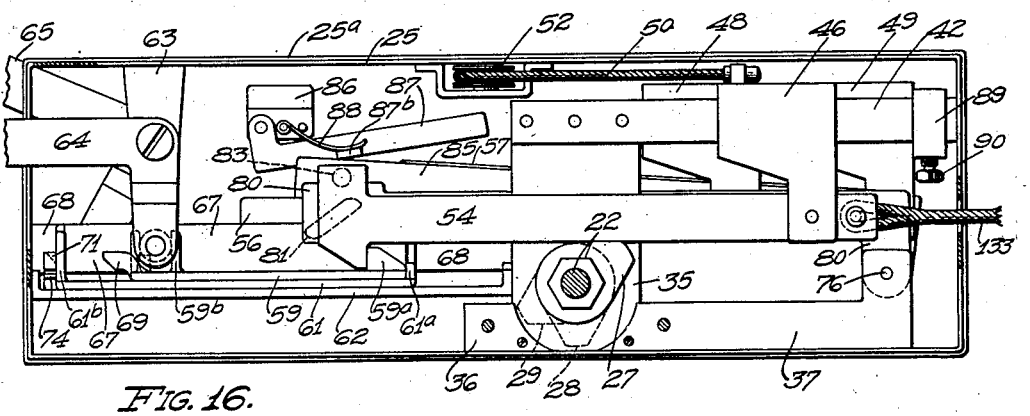
Figure 17:
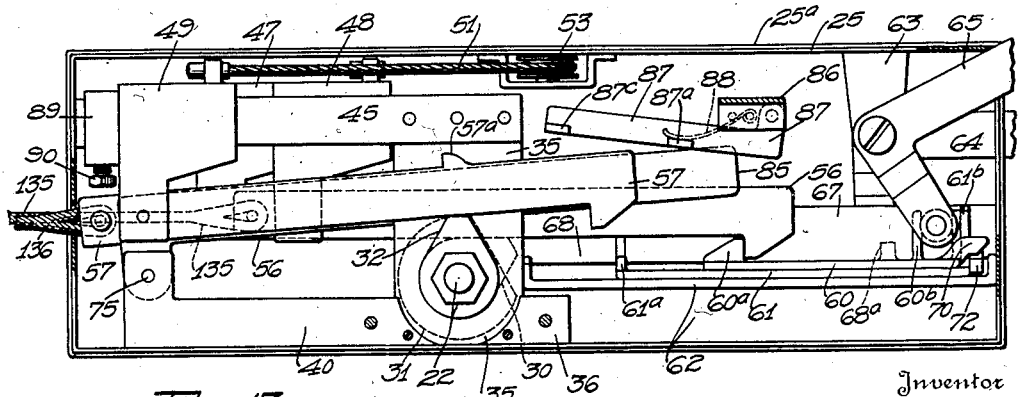

With these and other objects in view, as will appear hereinafter, my invention consists of certain novel features of construction, combination and arrangement of parts and portions, as will be hereinafter described in detail and particularly set forth in the appended claims. reference being had to the accompanying drawings and to the characters of reference thereon, which form a part of this application, in which:

Figure 1 is a fragmentary view in plan of my power transmission control mechanism, embodied in an automobile, showing the chassis, power plant and other portions thereof, fragmentarily, and certain parts and portions of my mechanism broken away and in section to facilitate the illustration, and also showing by dotted lines certain shifted positions of certain members thereof; Fig. 2 is an enlarged side elevational view of the equalizing means of my mechanism, with the view taken at 2—2 of Fig. 1; Fig. 3 is an enlarged sectional elevational view of the means for operating the secondary clutch and for rotating the shiftable gears of the transmission mechanism, the section being taken at 3—3 of Fig. 1; Fig. 4 is a fragmentary sectional elevational view of my transmission control mechanism, taken at 4—4 of Fig. 1, showing certain parts and portions thereof broken away and in section to facilitate the illustration, and showing by dotted lines certain shifted positions of certain members thereof, and also showing fragmentarily by broken lines the frame of the vehicle; Fig. 5 is a transverse sectional view of the secondary clutch, taken through 5—5 of Fig. 1; Fig. 6 is a fragmentary end view of the steering wheel of the vehicle, taken at 6—6 of Fig. 4, showing my manual selecting means supported thereon; Fig. 7 is an enlarged longitudinal sectional elevational view through the transmission and secondary clutch mechanism, taken through 7—7 of Fig. 1; Fig. 8 is a framentary transverse sectional view of the transmission mechanism, taken through 8—8 of Fig. 7; Fig. 9 is a fragmentary sectional elevational view thereof, taken through 9—9 of Fig. 8; Fig. 10 is an enlarged plan view of the gear selecting means of my mechanism, with the upper cover of the case enclosing the same removed, and showing certain parts and portions thereof broken away and in section to facilitate the illustration, and also showing by dotted lines certain shifted positions of certain members thereof, the means being shown in a position as having shifted the low and reverse gear to the reverse position; Fig. 11 is another view of the same, taken from the under side thereof, with certain parts and portions thereof broken away and in section to facilitate the illustration; Figs. 12, 13, 14 and 15 are transverse sectional views thereof, taken respectively through 12—12, 13—13, 14—14 and 15—15 of Fig. 10; Fig. 16 is a view similar to that shown in Fig. 10, but in a position as having shifted the intermediate and high gear of the transmission mechanism to the intermediate position; and Fig. 17 is an under side view of the transmission gear selecting means, similar to that shown in Fig. 11, but with the members thereof in a position as related in connection with Fig. 16.

Like characters of reference refer to similar parts and portions throughout the several views of the drawings.

My power transmission control mechanism consists essentially of a manual speed and direction selecting means A, an enclosed gear selecting means B, means connecting the former with the latter, a clutch pedal means C, an equalizing means D connecting said clutch pedal means C with said gear selecting means B, a ratchet and pawl means E in connection with the means connecting the manual selecting means A and the gear selecting means B and connected with the clutch pedal means C for automatically and consecutively changing the speeds of the vehicle from "low" to "high," a gear shifting means F connected with said gear selecting means B and mounted in connection with the case of the transmission mechanism of the vehicle, clutch means G and H actuated by the foot clutch pedal means C, the former connecting the power plant of the vehicle with the transmission mechanism and the latter connecting the transmission mechanism with the propelling means of the vehicle, a means I in connection with the latter mentioned clutch means H for actuating the same and for slightly rotating the shiftable gears of the transmission mechanism, and a lever, cam and bellcrank means J for actuating the means I.

The manual speed and direction selecting means A of my transmission control mechanism consists, in its preferred embodiment, of an annular index member 1, supported by arms 1ª on the normally upper end of a stationary tube 2, a rod 4 extending through the tube 2, and a manually shiftable and rotatable selecting arm 3 secured to the normally upper end of the rod 4 extending beyond the tube 2, the stationary tube above mentioned being conventionally known as the sector bracket tube of the steering post, and extends longitudinally therethrough. Around the tube 4, extending beyond the upper end of the tube 2, is positioned a compression spring 5 which tends to keep the selecting arm 3 in an outward position, as shown best in Fig. 4, there being provided a collar 8 near the opposite end of the rod 4 for limiting the upper or outward position of the rod. In the inner wall of the annular index member 1, which is constructed in the form of a band, is provided a plurality of spaced notches or depressions 1ᵇ, preferably six in number, which are designated by the characters R, A, N, L, 2 and H, designating, respectively, "reverse", "alternate", "neutral", "low", "second", and "high". At the outer end of the arm 3 is reciprocally mounted a plunger 6 which is held in an outward position by a compresison spring 7 positioned in the recess in which the plunger is mounted. This plunger is adapted to engage the notched portions 1ᵇ of the member 1 to frictionally hold the selecting arm 3 in certain shifted positons. At the inner side of the member 1 is provided an inwardly projecting flange or sector 1ᶜ which extends between the notches designated H and N, but is slightly spaced from said notches. The reciprocal mounting of the rod 4 within the tube 2 permits the selecting arm 3 to be shifted inwardly so that the outer end of the arm may engage the under side of the sector 1ᶜ and be retained in said depressed position relatively to the member 1 until released, as will be described later.

At the normally lower or forward end of the rod 4, extending beyond the lower or forward end of the steering post, is provided a bevel gear 9 which meshes with another bevel gear 10, both being supported relatively to each other by a bracket 11, the connection between the gear 9 and the rod 4 being such as to permit the rod to be longitudinally shifted therethrough and at the same time rotate the gear. At the back side of the gear 10, or on the spindle on which the gear is mounted, is secured a sprocket 12; and at the front side thereof is secured a ratchet 13 which is adapted to be engaged and rotated by a pawl lever 14 which is also adapted to rotate the gears 9 and 10 and the sprocket 12, as will be described later. At the lower portion of the bracket 11 is pivotally mounted a pawl lever raising or shifting member 15 which is adapted to disengage the pawl portion of the lever 14 from engagement with the teeth of the ratchet 13. At the pivotal connection of the member 15 with the bracket 11 is provided a spring 16 for normally retaining the member 15 and the pawl lever 14 in a raised position, as shown by solid lines in Fig. 4 of the drawings.

The sprocket 12 is connected, by means of a chain 18, with another sprocket 17 secured at the one end of a shaft 19 revolubly mounted at the upper side of the case 25 of the gear selecting means B. At the opposite end of the shaft 19 is secured a bevel gear 20 which meshes with and is adapted to rotate another bevel gear 21 which is secured to the end of the cam supporting shaft 22 revolubly mounted in and extending transversely through the case 25. The case 25 is supported at its one end on, and communicates with the interior of, the cover 26 of the transmission mechanism of the vehicle. It will be noted, however, that the case 25, enclosing the gear selecting means, may be supported in various positions relatively to the transmission mechanism of the vehicle without deviating from the spirit of the invention, which will appear obvious hereinafter.

The gear selecting means B of my mechanism is shown in various positions on an enlarged scale and in detail in Figs. 10 to 17 of the drawings. Within the case 25 enclosing said means and on the shaft 22, extending therethrough, is mounted a plurality of cams 27, 28, 29, 30, 31 and 32. The portion of the shaft 22 positioned within the case 25 is preferably hexagonal in cross-section providing simplicity of construction and correct positioning of the cams thereon. The several cams are spaced from each other and retained in their respective positions by guide plates 35 extending partially across the case. The guide plates 35 are supported in spaced relation relatively to each other at their normally rear, or near, ends, as shown in the drawings, by spacer members 36, and spacer and pivot members 37, 38, 39 and 40, and at their normally forward ends, by means of alternately positioned short spacer members 41 and spacing slide bars 42, 43, 44 and 45, which slide bars extend toward the normally right side of the vehicle, as shown in the drawings. These slide bars 42, 43, 44 and 45 are positioned in respectively the same planes with the reverse cam 27, the low gear cam 29, the intermediate gear cam 30, and the high speed cam 32. On the slide bars, above mentioned, are reciprocally mounted the link supporting slides 46, 47, 48 and 49, respectively. The slides 46 and 47 and the slides 48 and 49 are respectively connected together by flexible conductors, such as cables 50 and 51, which extend, respectively, around sheaves 52 and 53 revolubly mounted on the normally forward wall of the case 25. Thus, it will be seen that when one slide moves to the right, the other slide, connected therewith, is automatically shifted to the left. At the normally rear ends of the link supporting slides 46, 47, 48 and 49 are pivotally connected the one or right-hand ends of the gear shifting links 54, 55, 56 and 57, respectively, said links being provided at the ends, opposite their pivotal connections with the slides, with hook portions adapted to be engaged by corresponding hook portions of the reciprocating hook slides 59 and 60, the former being adapted to engage the hook portions of the links 54 and 55, and the latter the hook portions of the links 56 and 57.

Said gear shifting links and the levers 80 and 85, similarly positioned as will be described hereafter, are held in constant engagement with their respective cams by means of leaf springs 58 secured to the slide bars and short spacer members 41 in line with the respective cams, said springs being preferably provided at their free ends with shoes 58ª for engagement with the links and levers.

The hook slides 59 and 60 are reciprocally positioned within and against the normally forward side of a compensating slide 61 which in turn is reciprocally mounted against the normally forward side of the positioning guide member 62 positioned in the normally left hand side of the case 25 and secured to the normally rear wall thereof. The compensating slide 61 may be made of a pair of oppositely disposed structural angle members with the one flange of each secured to each other as shown best in Fig. 12. The reciprocating hook slides 59 and 60 are retained, at their adjacent edges, in position against the compensating slide 61 by means of retaining members 67 secured to the opposite sides of the flanges of the angle members securing the compensating slide together as a unit, as shown best in Fig. 12. Said reciprocating hook slides 59 and 60 are also retained in position at their opposite or outer edges against the normally forward side of the compensating slide by means of retaining members 68 secured to the inner sides of the cover members 25ᵇ of the case 25, said retaining members 68 serving also to retain the compensating slide 61 in position against the positioning guide member 62.

Figures 12, 13:
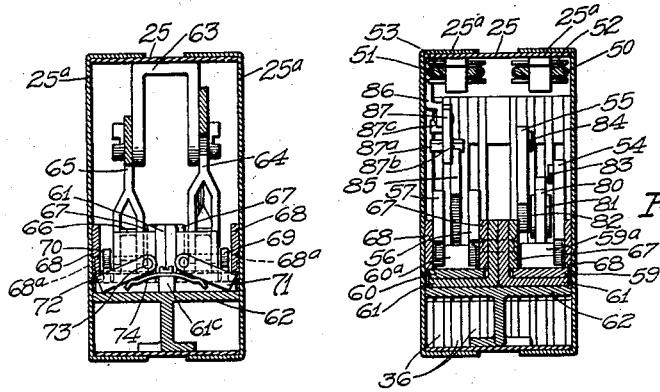

Said reciprocating hook slides 59 and 60 are provided, respectively, at their one or normally righthand ends with hook portions 59ª and 60ª, which hook portions are adapted to engage the hook portions of the gear shifting links, previously mentioned, and are also provided at their opposite ends with forwardly extending bifurcated portions 59ᵇ and 60ᵇ. Within and at the lefthand end of the case 25 are pivotally mounted, on a bracket 63 secured to the front wall of the case 25, a pair of bellcrank levers 64 and 65, the one ends of the one arms thereof extending beyond the lefthand end of the case. The other arms of said bellcrank levers are preferably bifurcated and provided with rollers 66 which are positioned, respectively, in the bifurcated portions of the reciprocating hook slides, as shown in Figs. 10, 11 and 13.

At the normally righthand end of the compensating slide 61 are provided forwardly extending lugs 61ª which are adapted to engage, or be engaged by, the righthand ends of the reciprocating slides 59 and 60, as will be described later. At the opposite or lefthand end of the compensating slide are provided other forwardly extending lugs 61ᵇ which are adapted to engage, or be engaged by, the lefthand ends of said reciprocating hook slides, as will also be described later.

The outer ends of the arms of the bellcrank members 64 and 65 extending beyond the case 25 are pivotally connected by the equalizing means D to the free end of an arm 98 secured to the clutch shaft 96 of the clutch pedal means C. To the shaft 96 is also secured the conventional clutch pedal 97 for manually rotating the shaft.

The equalizing means D, above mentioned, consists of a pair of substantially parallel rods 101 and 102 reciprocally supported by a guide member 103 secured at the free end of a link member 104, a rocker member 105 pivotally mounted intermediate its ends intermediate the ends of the link member 104, and a pair of links 106 and 107 pivotally connecting, respectively, the one end of the rocker member 105 with the one end of the rod 101, and the opposite end of the member 105 with the one end of the rod 102. The opposite ends of the rods 101 and 102 are pivotally connected with the outer ends of the arms of the bellcrank members 64 and 65 extending beyond the case 25, while the link 104 is pivotally connected, by means of a slotted portion 104ª at the end opposite the member 103, with the bifurcated portion at the free end of the arm 98. The pawl lever 14, previously mentioned, is pivotally connected at the end opposite its pawl portion with the link member 104, as shown best in Fig. 2 of the drawing.

The clutch shaft or rod 96 extends into the rear portion of the flywheel housing 111 of the power plant or engine 110 and is operatively connected in any suitable manner to the conventional clutch means G, shown by dotted lines in Fig. 1 of the drawings in connection with the flywheel of the engine 110, said clutch means G being adapted to connect and disconnect the transmission mechanism of the vehicle with and from the power plant thereof. The slotted portion 104ª, at the one end of the link 104 of the equalizing means connected with the arm 98 of the clutch pedal means, permits the clutch pedal 97 to be depressed slightly before the link 104 is shifted forwardly, the initial forward movement of the pedal 97 actuating the clutch means G, which disconnects the transmission mechanism of the vehicle from the power plant 110. Figs. 1 and 2 show the clutch pedal means in the extreme forwardly shifted position, with the clutch means G in a position disconnecting the transmission mechanism from the power plant, and the link 104 of the equalizing means also shifted forwardly. The equalizing means D is shown in the drawings with the rod 101, connected with the low and reverse bellcrank member 64, in a forwardly shifted position for shifting the low and reverse gear of the transmission mechanism of the vehicle into operative engagement with other gears thereof, and the other rod 102 of the equalizing means, connected with the intermediate and high bellcrank member 65, in a neutral position.

The gear shifting means F of my control mechanism, illustrated best in Figs. 1, 7, 8 and 9 of the drawings, and connected to the transmission gear selecting means B, as will be described later, is preferably positioned in the cover 26 mounted over the conventional transmission gear case 112 in which the conventional transmission gearing is positioned, and which is secured to the flywheel housing 111. The transmission gear shifting means F takes the place of the conventional gear shift lever means mounted above and in connection with the transmission mechanism.

Extending longitudinally through the cover 26 and positioned to one side of the median line thereof is a pair of superimposed gear shifting member supporting and guide bolts 116 and 117, preferably of rectangular cross-section, and slightly spaced from each other. On an around said supporting and guide bolts are mounted the supporting slides 118 and 119, respectively, the former extending beyond and downwardly at one side of the latter. To the lower portion of the slide 118 is secured, in any convenient manner, a gear shifting member 120 which is provided at its lower end with a bifurcated portion 120ª adapted to straddle and extend into the annular grooved portion 121ª of the low and reverse gear 121 reciprocally mounted on the sectional main shaft 122 of the transmission mechanism. The supporting slide 119 extends downwardly from the supporting and guide bolt 117. On the one side of the downwardly extending portion of the slide 119 is secured a pair of spaced apart supporting and stop members 119ª and 119ᵇ, as shown best in Figs. 8 and 9. On said supporting and stop members are reciprocally mounted the longitudinally extended ends of the gear shifting member 123 which extends downwardly therefrom and is provided at its lower end with a bifurcated portion 123ª straddling and extending into the annular grooved portion 124ª of the high and intermediate gear 124, also reciprocally mounted on the shaft 122. The gear shifting member 123 is not fixedly secured to the slide 119, as described in connection with the other gear shifting member, but is normally held in positive engagement with the supporting and stop member 119ᵇ at the forward end of the slide 119, by means of a tension spring 125, secured at its ends to lugs on the slide 119 and the gear shifting member 123.

Within the case or cover 26 enclosing the gear shifting means F are revolubly mounted four sheaves 129, 130, 131 and 132, the same being positioned in pairs adjacent each other, the former two 129 and 130 being positioned over and in axial alinement with the latter two, as shown best by dotted lines in Fig. 9. Around said sheaves extend, respectively, the flexible connectors or cables 133, 134, 135 and 136, which are connected at their one ends to lugs at the ends of the gear shifting member supporting slides 118 and 119 and at their opposite ends to near the pivotally mounted ends of the gear shifting links 54, 55, 56 and 57 of the gear selecting means B, the cable 133 connecting the forward end of the slide 118 with the gear shifting link 54, the cable 134 connecting the normally rear end of the slide 118 with the link 55, the cable 135 connecting the forward end of the slide 119 with the link 56, and the cable 136 connecting the rear end of the slide 119 with the link 57.

Figure 14:
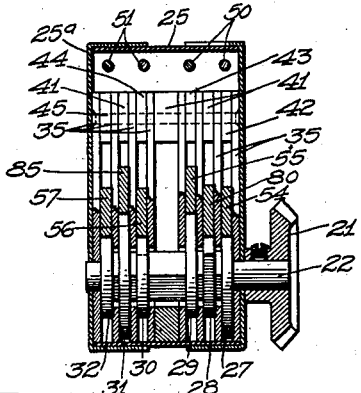
Figure 15:
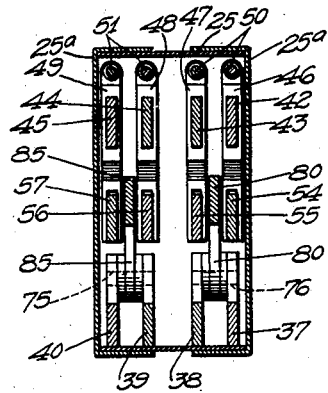

It will be seen from the above that when the manual selecting arm 3 of the manual selecting means A is shifted to the reverse position shown by solid lines in Fig. 6 of the drawings, the cams of the gear selecting means B within the case 25 will be shifted to the positions shown in Figs. 10, 11 and 14, permitting the gear shifting links 54, 56 and 57 to be shifted toward the rear side of the case 25, by means of the springs 58, which shifting of said links permits the former to be positively engaged by the reciprocating hook slide 59 and the latter two to be engaged by the hook slide 60. When the foot pedal 97 is depressed, the clutch means G and H will be actuated, releasing or disconnecting the transmission mechanism from the power plant and driven or propelling mechanism; the link 104 of the equalizing means will then be drawn forwardly, shifting the bell-crank members 64 and 65, by means of the equalizing means, forwardly or to the positions shown by solid lines in Figs. 10 and 11 the latter being in the neutral position and the former in the gear shifting position. The links 56 and 57, being connected with each other by the cable 51, at their right hand ends and both engaging the hook portions 60ª of the hook slide with the hook portions at their opposite ends, will retain the hook slide 60 in the neutral position, as shown, and also the high and intermediate gears connected with the links 56 and 57, and since the gear shifting link 55 is positioned to clear the hook portion 59ª of the hook slide 59, the reverse gear shifting link 54 is the only one that is shifted to an extreme position to the left when the clutch pedal is depressed, as stated. The link 54, being connected with the forward end of the supporting slide 118, will shift the same to the rear or reverse position shown in Figs. 1, 7 and 9, shifting the low and reverse gear 121 in mesh with the idler gear 139, which idler gear meshes with the reverse gear portion 137ᶜ of the gear 137 of the transmission mechanism. The gear shifting links 56 and 57, remaining in the neutral position, will retain the slide 119 and, therefore, the high and intermediate gear, in the neutral position, as shown.

At the lefthand ends of the reciprocating hook slides 59 and 60 are provided latch tripping lugs 69 and 70, respectively, which lugs extend beyond the lefthand ends of the reciprocating hook slides and are adapted when said hook slides are shifted from the receded positions, shown by dotted lines, to their intermediate or neutral positions, which is the position between the dotted and solid line positions, to engage latch members 71 and 72 pivotally mounted on pins 73 at the lefthand end of the compensating slide 61, as shown in Figs. 10, 11 and 13. When the compensating slide 61 is in a neutral position, which is the position shown by dotted lines in Fig. 10, the latch or locking members 71 and 72 are adapted to be forced forwardly about their pivotal supports into notches 68ª in the retaining members 68, as shown by dotted lines in Figs. 10, 11 and 13. Said latch or locking members are forced forwardly, as stated, by means of a spring 74 secured intermediate its ends on a lug 61° extending to the left from the compensating slide, as shown in Fig. 13.

Assuming the compensating slide to be shifted to the dotted line position, shown in Fig. 10, the same will be locked, by means of the latch members 71 and 72, relatively to the retaining members 68. The positioning of the compensating slide, as stated, takes place when the foot pedal 97 is released by the foot and permitted to be shifted backwardly. As the foot pedal is depressed, the bellcrank members 64 and 65 are shifted about their pivotal mountings and are adapted to force the reciprocating hook slides 59 and 60 to the left. Assuming that the high and intermediate gear of the transmission mechanism is in mesh, the bellcrank member 64 will yield more readily than the bellcrank member 65 and will be shifted from the dotted line position, shown in Fig. 10, to an intermediate position between the dotted line and solid line positions, and permit the lefthand end of the reciprocating hook slide 59 to engage the one lug 61ᵇ of the compensating slide, and will also permit the lug 69 thereof to engage the latch member 71, disengaging said latch member from the notched portion 68ᵃ in the one retaining member 68. The bellcrank member 64, not being permitted to be shifted farther about its pivotal support by reason of the positive engagement of the hook slide 59 with the lug 61ᵇ, will permit the bellcrank member 65 to be shifted, drawing the high and intermediate gears out of mesh into the neutral position before the bellcrank member 64 is permitted to draw the low and reverse gear to either the low or reverse position in engagement with the gears of the transmission mechanism. As the reciprocating hook slide 60 is shifted to the left, the lug 70 thereon will engage the latch member 72, compressing the same against the action of the spring 74 and releasing the compensating slide 61 from positive engagement with the retaining members 68. The gear shifting links 56 and 57, being both permitted to engage the hook portion of the hook slide 60, will not permit said hook slide to be shifted farther to the left, but the compensating slide being released, will permit the bellcrank member 64 to shift the reciprocating hook slide 59 to the extreme left position shown by solid lines in Fig. 10, which shifting of the hook slide, by reason of its positive engagement with the reverse gear shifting link 54, shifts the low and reverse gear of the transmission mechanism of the vehicle to the reverse position.

Thus, it will be seen, that no gear of the transmission mechanism can be shifted into mesh or operative relation with other gears thereof unless the other shiftable gear is first shifted and locked into a neutral position.

When desiring to shift the mechanism of the vehicle into low gear, the selector arm 3 of the manual selecting means is shifted into engagement with the notched portion of the member 1 designated by L. Said shifting of the arm 3 rotates the cam supporting shaft 22 so that the gear shifting link 55 is released and shifted into operative position relatively to the hook portion 59ᵃ of the slide 59, and the gear shifting link 54 is shifted forwardly or into an inoperative position relatively to the hook portion of the slide 59. It will be here noted that as the clutch pedal 97 is released by the foot, which permits the driven or propelling mechanism to be connected with the power plant of the vehicle, the bellcrank members 64 and 65 are automatically shifted to the position shown by dotted lines in Fig. 10, which shifting of said bellcrank members permits the reciprocating hook slides, and also the compensating slide, to be shifted to the right, as shown by dotted lines in Fig. 10.

When the foot pedal is again depressed, the reciprocating hook slide 59 being in engageable relation with the hook portion of the low gear shifting link 55, and the low and reverse gear of the transmission mechanism being in mesh with the reverse idler gear thereof, will permit the reciprocating hook slide 60 to be shifted to the left first and permit the lug 70 thereof to engage the latch member 72 and disengage the latter from the notched portion of the retaining member 68 at the lower side of the case 25. The compensating slide, being still locked relatively to the case by reason of the engagement of the latch member 71 with the notched portion 68ᵃ in the other retaining member 68, will remain in a neutral position. The bellcrank member 65, being shifted to the left as far as possible, will permit the other bellcrank member 64, by reason of its connection with the equalizing means D, to shift the latter bellcrank member from the dotted line position to the neutral position, disengaging the low and reverse gear from engagement with the reverse idler gear of the transmission mechanism and shift the same to its neutral position. When the bellcrank member 64 is shifted to the neutral position, the latch member 71 on the compensating slide 61 will be engaged by the disengaging lug 69 on the reciprocating hook slide 59 and permit the compensating slide to be shifted to the left, the releasing of said compensating slide from positive engagement with the retaining members 68 will permit the reciprocating hook slide 59 to be shifted by the bellcrank member 64 to the extreme left position shown by solid lines in Fig. 10. The shifting of the hook slide 59 from the neutral position to the solid line position, shown in Fig. 10, results in the shifting of the low and reverse gear 121 of the transmission mechanism of the vehicle on the shaft 122 into mesh with the low gear portion 137ª of the gear 137 of the transmission mechanism, by reason of the connection of the link 55, by means of the cable 134, with the gear shifting member 120.

When desiring to shift the driven or propelling mechanism of the vehicle alternately into reverse and low, the selector arm 3 is shifted to the position designated A on the member 1, which shifting rotates the cam supporting shaft 22 to a position so that both of the gear shifting links 54 and 55 are released and permitted to be shifted into operative relation with and adapted to be engaged by the hook portion of the reciprocating hook slide 59. When the selector arm 3 is shifted as last stated, the alternating cam 28 is shifted into play and forces the alternating lever 80 forwardly, said lever being pivotally mounted at its one or right hand end on the pin 76 extending through forwardly extending lug portions of the spacing and pivot members 37 and 38. On the opposite sides of the free end of the alternating lever 80 are secured inclined cam members 81 and 82, shown best in Figs. 10 and 12, said cam members being respectively adapted, when said lever 80 is shifted as stated, to be engaged by pins or rollers 83 and 84 mounted at the adjacent sides and near the free ends of the gear shifting links 54 and 55, respectively.

Assuming the gear shifting links 54 and 55 and the alternating lever 80 to be in the alternating position, as stated, and the reverse and low gear of the transmission mechanism shifted to the reverse position and the clutch pedal depressed, as shown, the inclined end of the hook portion of the reciprocating hook slide 59, when shifted toward the dotted line position, shown in Fig. 10, when the clutch pedal is permitted to be shifted backwardly, will engage a corresponding inclined portion of the hook portion of the gear shifting link 55 and force the latter forwardly from the former until the hook portion of the former passes the hook portion of the latter. When the clutch pedal is again depressed, the bellcrank member will be shifted to the solid line positions shown in Figs. 10 and 11, drawing the gear shifting link 55 to the left or to the former position of the link 54, and shifting the latter to the position of the former, which shifting of the link 55 shifts the low and reverse gear of the transmission mechanism to the low position. When the link 54 is shifted, as stated, the pin 83 thereof engages the forward inclined side of the cam member 81 of the lever 80 and forces the link 54 forwardly as the reciprocating hook slide is drawn to the left, thus avoiding engagement of the hook portion of the latter with that of the former.

It will be here noted that as the link 55, with its hook portion in engagement with the hook portion of the hook slide, is drawn to the left, the pin 84 secured at its free end will engage the rear inclined side of the cam member 82 of the alternating lever 80, forcing said lever forwardly about its pivotal mounting until the pin 84 passes or is disengaged from the cam member 82, permitting said lever to assume its initial position. Thus, it will be seen that both cam members 81 and 82 and pins 83 and 84 tend to force the link 54 forwardly to permit its hook portion to clear the passing hook portion of the hook slide. As the clutch pedal is again permitted to be shifted backwardly, the inclined portion of the hook portion of the slide 59 engages the inclined portion of the hook portion of the link 54 tripping the latter and again assuming the position shown by dotted lines. As the clutch pedal is again depressed, the link 54 is drawn outwardly or to the left, again shifting the low and reverse gear to the reverse position. During the latter shifting of the link 54, the pin 84 of the link 55, shifted in the opposite direction from the link 54, will engage the cam member 82 on the alternating lever 80 which forces the link 55 forwardly to avoid the passing hook portion of the reciprocating hook slide 59.

Thus, it will be seen that when the manual selecting arm 3 is shifted to the alternating position indicated by A on the member 1, the direction of the vehicle is alternately changed to low and reverse by merely depressing and releasing the clutch pedal in the conventional manner.

When desiring to shift the intermediate and high gear of the transmission mechanism to the intermediate position, the manual selector arm 3 is shifted in engagement with the notched portion of the member 1 designated by 2, indicating second speed. When the selector arm 3 is so shifted, the cams on the shaft 22 are so positioned that the hook portions of the reverse and low gear shifting links 54 and 55, respectively, are shifted into operative relation and adapted to be engaged by the hook portion of the reciprocating hook slide 59, as shown in Fig. 16. Also, when the selector arm 3 is shifted, as last stated, the cams 30, 31 and 32 are rotated to the positions shown in Fig. 17, the cam 32 shifting the high speed shifting link 57 forwardly about its pivotal axis on the slide 49, and the cam 31 shifting the high gear release lever 85 forwardly about its pivotal axis, said lever being pivotally mounted at its one end on the pin 75 supported in forwardly extending lugs at the one end of the spacing and pivot members 39 and 40, as shown best in Figs. 15 and 17. When the link 57 and the lever 85 are shifted, as last stated, the intermediate gear shifting link 56 is released, permitting the hook portion thereof to be engaged by the hook portion 60$^a$ of the reciprocating hook slide 60, as shown in Fig. 17. It will be here noted that before the intermediate and high gear of the transmission mechanism is shifted to the intermediate speed position, the gear shifting links 56 and 57 are either positioned at their opposite extremities from the positions shown in Fig. 17 or in their neutral positions, as shown in Fig. 11; and as the clutch pedal 97 is permitted to be shifted backwardly, the inclined portion of the hook portion 60$^a$ engages the inclined portion of the hook portion of the shifting link 56, forcing the latter forwardly until the hook portion 60$^a$ passes the hook portion of the link 56; then, as the foot pedal is again depressed, the hook portion of the reciprocating hook slide 60 positively engages the hook portion of the link 56, drawing the latter with the former and shifting the intermediate and high gear into mesh with the gear portion 137$^b$ of the gear 137 of the transmission mechanism of the vehicle.

When desiring to directly connect the propelling means of the vehicle with the power plant or to shift the intermediate and high gear of the transmission mechanism thereof for high speed driving, the manual selector arm 3 is rotated into engagement with the notched portion designated H, which shifts the cams 30, 31 and 32 to such a position that the positions of the links 56 and 57 and the lever 85 are reversed so that only the hook portion of the gear shifting link 57 is adapted to be engaged by the hook portion of the reciprocating hook slide 60 and drawn to the position occupied by the gear shifting link 56 in Fig. 17 when the clutch pedal is depressed. On the inner side of the lower cover member 25$^a$ of the case 25, and near the free ends of the gear shifting links, is provided an inwardly extending offset bracket 86 on which is pivotally mounted the one end of the high gear lock pawl 87 which is provided intermediate its ends with laterally extending lugs 87$^a$ and 87$^b$ which are adapted, respectively, to engage the normally forward edges of the link 57 and the lever 85 near their free ends, as shown in Figs. 11, 12, and 17. On the bracket 86 is mounted a spring 88 which is adapted to force the pawl 87 in engagement with said link and lever. At the free end of the pawl 87 is provided another laterally extending lug 87$^c$ which is adapted, when the pawl 87 is released, to positively engage a lug 57$^a$ provided intermediate the ends of and extending forwardly from the gear shifting link 57, for locking said link in the high position. The pawl 87 is released only when the manual selector arm 3 is shifted to the high position and the lug 87$^c$ thereof is adapted to positively engage the lug 57$^a$ only when the link 57 is shifted to the high position.

It will be here noted that the lugs 124$^b$ of the intermediate and high gear 124 and the lugs 138$^a$ at the one end of the primary drive gear 138, connected with the driveshaft of the power plant, are wide and spaced a considerable distance apart and, therefore, do not engage each other as readily as the conventional beveled gear teeth. When the gear shifting link 57 is drawn to the high position, the lug 87$^c$ engages the lug 57$^a$ of said link, locking the same in the high position and resiliently holding the ends of the engageable lugs of the gears 124 and 138 in engagement with each other by means of the tension spring 125 of the gear shifting means F until the gear 138 is rotated and the lugs thereof are in positive engagement with the lugs of the gear 124. The pawl means described above also serves to lock the lugs or teeth of said gears in mesh.

When it is desired to stop the vehicle and then consecutively change the speed from low to high, the manual selector arm 3 is shifted to a position intermediate the notches designated N and L, then depressed against the compression of the spring 5, then rotated counter-clockwise to the position designated by L on the member 1 and temporarily retained in said position by the inwardly extending arcuate flange or sector 1$^c$. When the clutch pedal is depressed before stopping the vehicle, the low and reverse gear is shifted to the low position, and when the pedal is again permitted to be shifted backwardly when desiring to proceed, the propelling or driven mechanism of the vehicle is connected in low gear with the power plant. It will be here noted that when the selector arm 3 is depressed, as stated, the rod 4 is shifted forwardly or downwardly, shifting the pawl lever positioning member 15 to the dotted line position, shown in Fig. 4, against the action of the spring 16, permitting the pawl portion 14$^a$ of the pawl lever 14 to be lowered in engagement with the teeth of the ratchet 13. When the clutch pedal is permitted to be shifted backwardly when connecting the driven mechanism of the vehicle with the power plant, as above stated, the pawl lever 14 is drawn backwardly, rotating the ratchet 13 one notch, which shifts the manual selector arm 3 to the position designated by 2 and simultaneously sets the gear selecting means B in the case 25 in such a position that when the clutch pedal is again depressed, the intermediate and high gear is shifted into mesh with the gear 137$^b$. When the clutch pedal is again permitted to be shifted backwardly to connect the driven mechanism of the vehicle with the power plant in intermediate gear, the pawl lever 14 is again drawn backwardly shifting the ratchet 13 another notch which simultaneously shifts the manual selector arm 3 to the position indicated by H on the member 1 where the same is released by the sector 1ᶜ and thrown outwardly by the compression spring 5 to its normal outward position. When the ratchet 13 is rotated, as last stated, the gear selecting means B is also set to shift the lugs 124ᵃ of the intermediate and high gear 124 into engagement with the lugs 138ᵃ of the main drive gear 138. When the clutch pedal is again depressed, the lugs of the gears 124 and 138 are shifted into engagement with each other, and when the clutch pedal is again permitted to be shifted backwardly, the driven mechanism of the vehicle is directly connected or connected in high gear with the driveshaft or power plant of the vehicle.

It will be here noted that the shiftable gears of the transmission mechanism are shifted at different distances in the various vehicles. To take care of this variation in the distances of the shifting of the gears, I have provided adjustable stops 89 which are mounted on the slide bars 42, 43, 44 and 45 and secured in position thereon by screws 90, said adjustable stop members 89 being adapted to variously limit the shifting of the slides 46, 47, 48 and 49, respectively mounted on the slide bars above mentioned, and, therefore, limit the shifting of the gears in the transmission mechanism.

While shifting the gears of the conventional transmission gear mechanism, when desiring to change the direction or speed of the vehicle, the shiftable gears often clash with the non-shiftable gears with which they are adapted to mesh, producing an undesirable noise, unnecessary wear on the gears and often a serious waste of time in the gear shifting operation in case of emergency. To reduce this undesirable feature to a minimum, I have provided a secondary clutch means H and a means I for slightly rotating the shiftable gears while the same are being shifted. The clutch means H is adapted to connect and disconnect the transmission mechanism with and from the driven or propelling mechanism of the vehicle, and may be of any suitable construction. The clutch means, shown in Figs. 1 and 7 of the drawings, consists of a large clutch control disc 151 shiftably mounted on the sectional main-shaft 122, a plurality of clutch discs 152 shiftably and non-revolubly mounted in connection with the control disc 151, a plurality of driven discs 153 positioned adjacent and intermediate the discs 152, and a disc supporting drum 154 in which the discs 153 are shiftably and non-revolubly supported relatively thereto, said drum 154 being secured to the normally forward end of the driven shaft 155 of the vehicle. The clutch control disc 151 is provided with a forwardly extending hub portion 151ᵃ, which is provided intermediate its ends with an annular groove 151ᵇ adapted to receive the clutch shoe 158. The end of the hub portion 151ᵃ is shiftably positioned within but non-revolubly relatively to the thrust member 156 revolubly positioned against the inner face of the journal portion of the stationary clutch casing 159 secured to the transmission casing 112. Between the end of the thrust member 156 and a shoulder portion on the hub 151ᵃ is positioned a compression spring 157 which is adapted to force the control disc 151 outwardly and normally connect the propelling mechanism of the vehicle with the transmission mechanism thereof.

The one end of the secondary clutch actuating rod 160 extends transversely through the upper portion of the casing 159 and is rotatably and shiftably mounted therein. On the portion of the rod 160 within the casing 159 is secured a bifurcated clutch actuating arm 161, the bifurcated portion 161ᵃ thereof extending around the clutch shoe 158 and is pivotally and shiftably connected to the lugs 158ᵃ extending outwardly from the same at diametrically opposed portions thereof, as shown best in Fig. 5. It will be here noted that the bifurcated portion 161ᵃ of the clutch actuating arm 161 is pivotally connected with the shoe 158 in such a manner that the former may be shifted together with the rod 160 transversely relatively to the former, as will be described later. Said clutch actuating arm 161 is provided with an upwardly extending boss 161ᵇ in which is reciprocally mounted a stud 162 which is provided at its one end with a head portion 162ᵃ which is adapted to be engaged by the adjacent side of the clutch control disc 151 when the same is shifted forwardly by the arm 161. Around the stud 162 and intermediate the head portion thereof and the boss 161ᵇ is positioned a compression spring 163 which is adapted to force the head portion 162ᵃ toward the disc 151, and in engagement therewith when the latter is shifted forwardly. At the opposite end of the stud 162 is provided a nut 162ᵇ for limiting the movement of the stud 162 toward the disc 151.

The opposite end of the clutch actuating rod 160 is rotatably and shiftably mounted in a journal member 164 supported on the one frame member 165 of the vehicle, as shown best in Figs. 1 and 3. Near the latter end of the rod 160 is secured the rod rotating lever or dog 166 which is provided at its free end with a laterally extending portion 166ᵃ which is adapted to be engaged by the normally forward end of a longitudinally extending ridge 167ᵃ projecting upwardly from the normally rear end of the shifting slide 167 reciprocally mounted on the bracket 169 secured to the frame member 165. This slide 167 is pivotally connected at its normally forward end, by means of a link 168, to the outer end of the clutch arm 99 secured to the clutch shaft 96 of the clutch pedal means C. To the frame member 165 is also secured another bracket 170 at the outer end and under side of which is pivotally mounted the bell crank member 171, the one arm 171ª of which engages with and is adapted to shift a collar 173 fixedly secured to the clutch actuating rod 160, as shown in Figs. 1, 3 and 4. The other arm 171ᵇ of the bellcrank member 171 is offset, as shown best in Figs. 3 and 4, and is pivotally connected at its end to the normally rear end of the shifting slide 167, by means of a bolt 172, said bolt extending through a longitudinal slot 169ª in the bracket 169, shown best in Fig. 1. The arm 171ᵇ of the bellcrank member 171 is also slotted at its end to permit free pivotal movement of the same relatively to the slide 167. When the clutch pedal 97 is depressed, the transmission mechanism is disconnected from the power plant 110 by the clutch means G in the conventional manner; and at the same time the clutch means H is actuated disconnecting the propelling means of the vehicle from the transmission mechanism thereof. The forward shifting of the foot pedal 97 draws the shifting slide 167 forwardly permitting the forward end of the ridge 167ª of said slide to engage the lateral projection 166ª of the clutch actuating lever or dog 166, rotating the same until said lateral projection rides at the upper edge of the ridge 167ª, as shown in Fig. 4. As the rod 160 is rotated by the dog 166, as stated, the clutch actuating arm 161 shifts the shoe 158 and, therefore, the control disc 151 forwardly, said forward shifting of the disc 151 permits the same to engage the head portion 162ª of the reciprocally mounted stud 162. The disc 151 rotates for a short period in the direction of the main shaft after said disc is shifted forwardly. The rotatable movement of said disc forces the bifurcated clutch actuating arm 161 and the rod 160, upon which the former is mounted, to the left of the vehicle. However, as the shifting slide 167 is shifted to the forward end of its stroke by the clutch pedal, the arm 171ª of the bellcrank member 171 engages the collar 173 secured to the rod 160, again forcing the same to the right, which, by reason of the engagement of the head portion 162ª of the stud 162 with the disc 151, rotates said disc. The disc 151, being connected in non-rotatable relation with the shiftable gears 121 and 124 of the transmission mechanism, rotates said gears slightly at the same time the gears are longitudinally shifted on the shaft 122 into mesh with the other gears or drive members of the transmission mechanism.

Thus, it will be seen that by disconnecting the transmission mechanism from the power plant and the propelling or driven mechanism of the vehicle, and by slightly rotating the shiftable gears of the transmission mechanism when said gears are shifted, the clashing of the gears, above mentioned, will be reduced to a minimum.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a mechanism of the class described, the combination with a power transmission mechanism, of a manual selecting means comprising a quadrant having an inwardly positioned quadrant channel, and a pivoted and longitudinally resilient and depressible selecting arm, a gear selecting means operatively connected with said manual selecting means, gear shifting members in connection with said transmission mechanism operatively connected with said gear selecting means, lever means operatively connected with said gear selecting means for actuating said gear shifting members, and ratchet and pawl means in connection with said manual selecting means and operatively connected with said lever means for so operating said gear selecting means as to consecutively and variously shift said gear shifting members, the pawl of said ratchet and pawl means being shifted into operative relation with the ratchet thereof when said selecting arm is depressed and shifted into the quadrant channel of said quadrant.

2. In a mechanism of the class described, the combination with a power transmission mechanism, of a manual selecting means comprising a quadrant having a receded circular selecting arm retaining channel, and a pivoted and longitudinally yieldable and depressible selecting arm, a gear selecting means operatively connected with said manual selecting means, gear shifting members in connection with said transmission mechanism operatively connected with said gear selecting means, lever means operatively connected with said gear selecting means for actuating said gear shifting members, and ratchet and pawl means in connection with said manual selecting means and operatively connected with said lever means for so operating said gear selecting means as to consecutively and variously shift said gear shifting members, the pawl of said ratchet and pawl means being shifted into operative relation with the ratchet thereof when said selecting arm is depressed and shifted into the receded circular channel of said quadrant, said selecting arm being controlled by said lever means and released from its depressed position in the circular channel of said quadrant after limited consecutive shifting of said gear shifting members.

3. In a mechanism of the class described, the combination with a power transmission gear mechanism, of a manual selecting means, a cam controlled gear selecting means provided with cams operatively connected with said manual selecting means and provided with levers and links actuated by said cams, gear shifting members in connection with said transmission gear mechanism controlled by said levers and links, a clutch means adapted to connect said transmission mechanism to a power plant, a clutch pedal operatively connected with said clutch and with the levers and links of said gear selecting means, for shifting said gear shifting members, and ratchet and pawl means in connection with and controllable by said manual selecting means and operatively connected with said clutch pedal for so operating said gear selecting means as to consecutively and variously shift said gear shifting members, said ratchet and pawl means being operable only when said manual selecting means is in a certain position.

4. In a mechanism of the character described, the combination with a power transmission gear mechanism, of a manual selecting means, a cam controlled gear selecting means provided with cams operatively connected with said manual selecting means and also provided with levers adapted to be shifted by said cams, cam means in connection with and adapted to be shifted by one of said levers for further shifting other of said levers, and gear shifting members in connection with said transmission gear mechanism operatively connected with said other levers.

5. In a mechanism of the character described, the combination with a power transmission gear mechanism, of a manual selecting means, a cam controlled gear selecting means provided with cams operatively connected with said manual selecting means and also provided with levers adapted to be shifted by said cams, cam means in connection with and adapted to be shifted by one of said levers for further shifting other of said levers, gear shifting members in connection with said transmission gear mechanism operatively connected with said other levers, and manually controlled gear shifting lever means so arranged relatively to said other levers of said gear selecting means as to alternately shift the same whereby one of said gear shifting members is alternately shifted in opposite directions.

6. In a mechanism of the character described, the combination with a power transmission gear mechanism, of a manual selecting means, a cam controlled gear selecting means provided with cams operatively connected with said manual selecting means and also provided with levers adapted to be shifted by said cams, cam means in connection with and adapted to be shifted by one of said levers for further shifting other of said levers, gear shifting members in connection with said transmission gear mechanism operatively connected with said other levers, a clutch in connection with said transmission mechanism, and a clutch pedal operatively connected with said clutch and so arranged relatively to said other levers of said gear selecting means as to alternately shift the same with the operation of said clutch pedal.

7. In a mechanism of the class described, the combination with a power transmission mechanism, of manual selecting means, a power transmitting member selecting means operatively connected with said manual selecting means, shifting members in connection with said transmission mechanism operatively connected with said power transmitting member selecting means, manual actuating means operatively connected with said power transmitting member selecting means for actuating said shifting members, and ratchet and pawl means in connection with and controllable by said manual selecting means and operatively connected with said manual actuating means for so operating said power transmitting member selecting means as to consecutively and variously shift said shifting members, said ratchet and pawl means being operable only when said manual selecting means is in a certain position.

8. In a mechanism of the class described, the combination with a power transmission gear mechanism, of a cam controlled gear selecting means provided with controllable cams and with levers and links actuated by said cams, gear shifting members in connection with said transmission gear mechanism controlled by said levers and links, a clutch means adapted to connect said transmission mechanism to a power plant, a lever means operatively connected with said clutch means and with the levers and links of said gear selecting means for shifting said gear shifting members, and an alternating means in connection with the levers and links of said gear selecting means for alternately shifting certain of the same to extreme positions by continuous operation of said lever means.

9. In a mechanism of the class described, the combination with a power transmission mechanism and a lever means, of a quadrant provided with a circular selecting arm retaining channel, an axially yieldable selecting arm mounted on an axis concentric with the circular channel of said quadrant, a ratchet in connection with said selecting arm, a pawl operable by said lever means and positioned contiguous to said ratchet, means in connection with said selecting arm and said pawl for releasing the latter and permitting the same to engage said ratchet when said selecting arm is depressed and shifted into the channel of said quadrant, a gear selecting means in connection with said power transmission mechanism, and gear shifting members in connection with said transmission mechanism operatively connected with said gear selecting means and with said lever means, said gear selecting means being operatively connected with said selecting arm, said gear shifting members being consecutively actuated by said lever means when said selecting arm is depressed and shifted into the channel of said quadrant.

10. In a mechanism of the class described, the combination with a power transmission mechanism and a lever means, of a quadrant provided with a circular selecting arm retaining channel, an axially yieldable selecting arm mounted on an axis concentric with the circular channel of said quadrant, a ratchet in connection with said selecting arm, a pawl operable by said lever means and positioned contiguous to said ratchet, means in connection with said selecting arm and said pawl for releasing the latter and permitting the same to engage said ratchet when said selecting arm is depressed and shifted into the channel of said quadrant, a cam controlled gear selecting means provided with cams operatively connected with said selecting arm and provided with levers and links actuated by said cams and operatively connected with said lever means, and gear shifting members in connection with said transmission gear mechanism controlled by said levers and links, said cams being adapted to be continuously operated and said gear shifting members to be consecutively shifted in certain extreme positions for shifting the gears in said transmission mechanism by the continuous operation of said lever means when said selecting arm is depressed and shifted into the channel of said quadrant.

11. In a gear selecting means, a support, a plurality of cams rotatably mounted therein, a plurality of slides longitudinally shiftably mounted on said support, a plurality of gear shifting links longitudinally shiftable and pivotally mounted on said slides, a transmission gear mechanism, and shiftable means connected with said gear shifting links and with shiftable gears of said transmission mechanism.

12. In a gear selecting means, a support, a plurality of cams rotatably mounted therein, a plurality of slides longitudinally shiftably mounted on said support, a plurality of gear shifting links longitudinally shiftable and pivotally mounted on said slides, shiftable means connected with said gear shifting links and adapted to be connected to gears adapted to be shifted, and means in connection with said gear shifting links for shifting certain of said links to extreme positions and the others of said links to neutral positions.

13. In a gear selecting means, a support, a plurality of cams rotatably mounted therein, a plurality of slides longitudinally shiftably mounted on said support, a plurality of gear shifting links longitudinally shiftable and pivotally mounted on said slides, shiftable means connected with said gear shifting links and adapted to be connected to gears adapted to be shifted, means in connection with said gear shifting links for shifting certain of said links to extreme positions and the others of said links to neutral positions, and a compensating means in connection with said last mentioned means for shifting all of said links to a neutral position before shifting any of said links to an extreme position.

14. In a gear selecting means, a support, a plurality of cams rotatably mounted therein, a plurality of gear shifting links longitudinally shiftable and pivotally mounted relatively to said support, shiftable means connected with said gear shifting links and adapted to be connected to gears adapted to be shifted, an alternating lever pivotally mounted at its one end on said support and adapted to be engaged and shifted by one of said cams, and cam means in connection with said lever and two of said gear shifting links for alternately shifting the same to extreme positions in one direction.

15. In a gear selecting means, a support, a plurality of cams rotatably mounted therein, a plurality of gear shifting links longitudinally shiftable and pivotally mounted relatively to said support, shiftable means connected with said gear shifting links and adapted to be connected to gears adapted to be shifted, an alternating lever pivotally mounted at its one end on said support and adapted to be engaged and shifted by one of said cams, cam means in connection with said lever and two of said gear shifting links for alternately shifting the same to extreme positions in one direction, and means in connection with said gear shifting links for shifting certain of said links to extreme positions and the others of said links to neutral positions.

16. In a gear selecting means, a support, a plurality of cams rotatably mounted therein, a plurality of gear shifting links longitudinally shiftable and pivotally mounted relatively to said support, shiftable means connected with said gear shifting links and adapted to be connected to gears adapted to be shifted, an alternating lever pivotally mounted at its one end on said support and adapted to be engaged and shifted by one of said cams, cam means in connection with said lever and two of said gear shifting links for alternately shifting the same to extreme positions in one direction, means in connection with said gear shifting links for shifting certain of said links to extreme positions and the others of said links to a neutral position, and a compensating means in connection with said last mentioned means and said links whereby said links are shifted to a neutral position before any of said links are shifted into an extreme operative position.

17. In a gear shifting means, the combination with a gear transmission mechanism provided with shiftable gears therein, of a case, a plurality of cams rotatably mounted therein, a plurality of slides reciprocally mounted in said case, a plurality of gear shifting links pivotally mounted on said slides in line with and adapted to be engaged and shifted by certain of said cams about their pivotal axes, and means connecting said gear shifting links with the shiftable gears of said transmission mechanism.

18. In a gear shifting means, the combination with a gear transmission mechanism provided with shiftable gears therein, of a case, a plurality of cams rotatably mounted therein, a plurality of slides reciprocally mounted in said case, a plurality of gear shifting links pivotally mounted on said slides in line with and adapted to be engaged and shifted about their pivotal axes by certain of said cams, means connecting said gear shifting links with the shiftable gears of said transmission mechanism, and reciprocating hook slides mounted in said case adapted to positively engage one of said gear shifting links and shift the same to an extreme position and adapted to shift others of said links to a neutral position.

19. In a gear shifting means, the combination with a gear transmission mechanism provided with shiftable gears therein, of a case, a plurality of cams rotatably mounted therein, a plurality of slides reciprocally mounted in said case, a plurality of gear shifting links pivotally mounted on said slides in line with and adapted to be engaged and shifted about their pivotal axes by certain of said cams, means connecting said gear shifting links with the shiftable gears of said transmission mechanism, reciprocating hook slides mounted in said case adapted to positively engage one of said gear shifting links and shift the same to an extreme position and adapted to shift others of said links to a neutral position, and a means for locking said links in a neutral position before any of said links are shifted to an extreme operative position.

20. In a gear shifting means, the combination with a gear transmission mechanism provided with shiftable gears therein, of a case, a plurality of cams rotatably mounted therein, a plurality of slides reciprocally mounted in said case, a plurality of gear shifting links pivotally mounted on said slides in line with and adapted to be engaged and shifted by certain of said cams about their pivotal axes, means connecting said gear shifting links with the shiftable gears of said transmission mechanism, reciprocating hook slides mounted in said case and provided with hook portions adapted to engage corresponding portions on said gear shifting links for shifting one of said links to an extreme position and others of said links to neutral positions, and lever means for reciprocating said hook slides.

21. In a gear shifting means, the combination with a gear transmission mechanism provided with shiftable gears therein, of a case, a plurality of cams rotatably mounted therein, a plurality of slides reciprocally mounted in said case, a plurality of gear shifting links pivotally mounted on said slides in line with and adapted to be engaged and shifted about their pivotal axes by certain of said cams, means connecting said gear shifting links with the shiftable gears of said transmission mechanism, reciprocating hook slides mounted in said case and provided with hook portions adapted to engage corresponding portions on said gear shifting links for shifting one of said links to an extreme position and others of said links to neutral positions, lever means for reciprocating said hook slides, and means mounted in said case adapted to positively engage said reciprocating hook slides for shifting said gear shifting links to a neutral position before shifting any of said links to an extreme operative position.

22. In a gear shifting means, the combination with a gear transmission mechanism provided with shiftable gears therein, of a case, a plurality of cams rotatably mounted therein, a plurality of slides reciprocally mounted in said case, a plurality of gear shifting links pivotally mounted on said slides in line with and adapted to be engaged and shifted about their pivotal axes by certain of said cams, means connecting said gear shifting links with the shiftable gears of said transmission mechanism, an alternating lever pivotally mounted within said case in engagement with one of said cams adapted to be shifted about its pivotal axis by the latter, and cam means in connection with said alternating lever and a pair of said gear shifting links for alternately shifting the latter in extreme positions in one direction, whereby certain shiftable gears of said transmission mechanism are alternately shifted in opposite directions.

23. In a gear shifting means, the combination with a gear transmission mechanism provided with shiftable gears therein, of a case, a plurality of cams rotatably mounted therein, a plurality of slides reciprocally mounted in said case, a plurality of gear shifting links pivotally mounted on said slides in line with and adapted to be engaged and shifted about their pivotal axes by certain of said cams, means connecting said gear shifting links with the shiftable gears of said transmission mechanism, an alternating lever pivotally mounted within said case in engagement with one of said cams adapted to be shifted about its pivotal axis by the latter, cam means in connection with said alternating lever and a pair of said gear shifting links for alternately shifting the latter in extreme positions in one direction, whereby certain shiftable gears of said transmission mechanism are alternately shifted in opposite directions, and lever means for alternately shifting said pair of gear shifting links in opposite directions.

In testimony whereof, I have hereunto set my hand at San Diego, California, this 3rd day of February, 1925.

OVID E. MARK.